(12) United States Patent
Tao et al.

(10) Patent No.: US 11,327,359 B2
(45) Date of Patent: May 10, 2022

(54) DISPLAY PANEL, METHOD FOR MANUFACTURING THE SAME AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Jian Tao, Beijing (CN); Wei Xue, Beijing (CN); Li Sun, Beijing (CN); Hongmin Li, Beijing (CN); Liqing Liao, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 539 days.

(21) Appl. No.: 16/332,168

(22) PCT Filed: Jun. 29, 2018

(86) PCT No.: PCT/CN2018/093688
§ 371 (c)(1),
(2) Date: Mar. 11, 2019

(87) PCT Pub. No.: WO2019/047601
PCT Pub. Date: Mar. 14, 2019

(65) Prior Publication Data
US 2021/0349347 A1     Nov. 11, 2021

(30) Foreign Application Priority Data
Sep. 5, 2017    (CN) .......................... 201710790365.2

(51) Int. Cl.
*G02F 1/1335*     (2006.01)
*G02F 1/1343*     (2006.01)

(52) U.S. Cl.
CPC .... *G02F 1/133553* (2013.01); *G02F 1/13439* (2013.01)

(58) Field of Classification Search
CPC ....................... G02F 1/133553; G02F 1/13439
See application file for complete search history.

(56) References Cited

U.S. PATENT DOCUMENTS

| 6,291,146 B1 * | 9/2001 | Chang ................. G02B 5/0215 349/113 |
| 6,573,959 B1 | 6/2003 | Molsen |

(Continued)

FOREIGN PATENT DOCUMENTS

| CN | 1311873 A * | 9/2001 | ........... G02F 1/1334 |
| CN | 1311873 A | 9/2001 | |

(Continued)

OTHER PUBLICATIONS

First Office Action Corresponding to Chinese Application No. 201710790365.2; dated Jul. 24, 2019; English Translation Attached.

(Continued)

*Primary Examiner* — Jia X Pan
(74) *Attorney, Agent, or Firm* — Nath, Goldberg & Meyer; Joshua B. Goldberg (57) ABSTRACT

Discloses are a display panel, a method of manufacturing the same and a display device. The display panel includes: a first substrate; a second substrate disposed opposite to the first substrate; and a reflective structure group disposed on the first substrate, the reflective structure group includes a plurality of reflective structures in one-to-one correspondence with visual fields of view, and a reflective surface of each reflective structure of the reflective structures faces the second substrate, and the reflective structure is configured to reflect light from the second substrate in a predetermined direction to a corresponding field of view.

17 Claims, 8 Drawing Sheets

(56) References Cited

U.S. PATENT DOCUMENTS

| | | | |
|---|---|---|---|
| 2002/0030774 A1* | 3/2002 | Yoshii | G02B 5/0221 349/113 |
| 2006/0203169 A1* | 9/2006 | Ozawa | G02F 1/1393 349/141 |
| 2012/0069063 A1 | 3/2012 | Sato et al. | |
| 2015/0109666 A1 | 4/2015 | Wei et al. | |
| 2019/0227332 A1 | 7/2019 | Qin et al. | |

FOREIGN PATENT DOCUMENTS

| | | | |
|---|---|---|---|
| CN | 101738760 A | | 6/2010 |
| CN | 102449383 A | | 5/2012 |
| CN | 103185293 A | * | 7/2013 |
| CN | 103185293 A | | 7/2013 |
| CN | 103454807 A | | 12/2013 |
| CN | 106937106 A | | 7/2017 |
| JP | 2003255265 A | | 9/2003 |
| KR | 20080086118 A | | 9/2008 |
| WO | 2017107313 A1 | | 6/2017 |

OTHER PUBLICATIONS

International Search Report; Application No. PCT/CN2018/093688; dated Sep. 25, 2018; English Translation Attached.
Extended European Search Report dated May 31, 2021 for application No. EP18853270.9.

* cited by examiner

DISPLAY PANEL, METHOD FOR MANUFACTURING THE SAME AND DISPLAY DEVICE

CROSS-REFERENCE TO RELATED APPLICATIONS

This is a National Phase Application filed under 35 U.S.C. 371 as a national stage of PCT/CN2018/093688, filed Jun. 29, 2018, an application claiming the benefit of Chinese Patent Application No. 201710790365.2, filed on Sep. 5, 2017, the contents of which are incorporated herein in their entirety by reference.

TECHNICAL FIELD

The present disclosure relates to the field of display technology, and in particular, to a display panel, a method for manufacturing the same, and a display device.

BACKGROUND

Stereoscopic display technology, that is, 3D display technology, mainly obtains two images of a same object at different angles in human vision, and projects the two images into left and right-eyes of the human, respectively, in order to generate a certain parallax for the images in left and right-eyes. When the brain synthesizes the left-eye image and the right-eye image with parallax, depth perception is generated, thereby forming an effect of stereoscopic image display.

Existing 3D display technology is mainly divided into two types: a glasses type and a naked-eye type. The glasses type 3D display technology requires wear of special glasses, which is not beneficial to portable devices. For mobile electronic products, the naked-eye 3D display technology is more emphasized.

In related naked-eye 3D display technology, a grating is disposed in front of or behind a display panel, so that light emitted by a left-eye pixel enters the left-eye of a user, and light emitted by a right-eye pixel enters the right-eye of the user. Related naked-eye 3D display device merely includes two fields of view, which is suitable for single-person viewing, but is not suitable for mufti-person viewing, and thus has certain limitations.

SUMMARY

An aspect of the present application provides a display panel, corresponding to at least two visual fields of view, including: a first substrate; a second substrate disposed opposite to the first substrate; and a reflective structure group disposed on the first substrate, the reflective structure group includes a plurality of reflective structures in one-to-one correspondence with the visual fields of view, such that a reflective surface of each reflective structure faces the second substrate, and each reflective structure is configured to reflect light from the second substrate in a predetermined direction to a corresponding visual field of view.

In an embodiment, the display panel is divided into a plurality of field-of-view display area groups in one-to-one correspondence with the reflective structure groups; each field-of-view display area group is divided into a plurality of field-of-view display areas corresponding to the visual fields of view; and the field-of-view display areas are in one-to-one correspondence with the reflective structures.

In an embodiment, each reflective structure includes a plurality of reflective substructures disposed along a first direction, and reflective surfaces of the respective reflective substructures in a same reflective structure are disposed in parallel.

In an embodiment, a shape of a longitudinal section of the reflective substructure is a right triangle, and a hypotenuse of the right triangle functions as the reflective surface.

In an embodiment, the reflective structure is made of a metal material.

In an embodiment, the display panel further includes an anti-crosstalk structure disposed between two adjacent reflective structures such that a side of the anti-crosstalk structure facing the second substrate is an anti-crosstalk surface parallel to the second substrate, and the anti-crosstalk surface is a reflective surface or a light absorbing surface.

In an embodiment, the anti-crosstalk surface is the reflective surface, and the anti-crosstalk structure is integrated formed with the reflective structure.

In an embodiment, the number of the visual fields of view corresponding to the display panel is 2 to 4.

In an embodiment, the display panel is a reflective liquid crystal display panel.

In an embodiment, the first substrate is provided with a pixel electrode made of a metal material, and the pixel electrode further functions as the reflective structure.

In an embodiment, the first substrate is provided with a common electrode made of a metal material, and the common electrode further functions as the reflective structure.

Another aspect of the present application provides a display device including the display panel described above.

Another aspect of the present application provides a method of manufacturing a display panel corresponding to at least two visual fields of view, including steps of: preparing a first substrate and a second substrate disposed opposite to the first substrate, respectively; and forming a reflective structure group disposed on the first substrate such that the reflective structure group includes a plurality of reflective structures in one-to-one correspondence with the visual fields of view, and a reflective surface of each reflective structure faces the second substrate, and each reflective structures is configured to reflect light from the second substrate in a predetermined direction to a corresponding visual field of view.

In an embodiment, the step of forming the reflective structure group includes: forming respective reflective structures in each reflective structure group such that each reflective structure includes a plurality of reflective substructures disposed along a first direction, and reflective surfaces of the respective reflective substructures located in a same reflective structure are disposed in parallel.

In an embodiment, the step of forming the respective reflective structures in each reflective structure group includes: forming, by a first patterning process, an initial pattern of the reflective substructure corresponding to the reflective substructure to be formed such that a shape of a longitudinal section of the initial pattern of the reflective substructure is a rectangle; and performing a bevel-etching process on the initial pattern of the reflective substructure by a second patterning process to form the reflective substructure such that a shape of a longitudinal section of the reflective substructure is a right triangle.

In an embodiment, the step of forming, by the first patterning process, the initial pattern of the reflective substructure corresponding to the reflective substructure to be formed includes: forming a reflective material film; coating an entire layer of a first photoresist over the reflective material film, exposing and developing the first photoresist to remove the first photoresist located in an etching region reserved for a vertical plane and retain the first photoresist located in a forming region for the reflective substructure and an etching region reserved for an inclined plane; and performing a dry-etching process on the reflective material film, and stripping the retained first photoresist after the dry-etching process is completed, to obtain an initial pattern of the reflective substructure.

In an embodiment, the step of performing a bevel-etching process on the initial pattern of the reflective substructure by the second patterning process to form the reflective substructure includes: coating an entire layer of a second photoresist over the initial pattern of the reflective substructure, exposing and developing the second photoresist to remove the second photoresist located in an etching region reserved for a vertical plane and retain the first photoresist located in a forming region for the reflective substructure and an etching region reserved for an inclined plane; and performing a wet-etching process on the initial pattern of the reflective substructure, and stripping the retained second photoresist after the wet-etching is completed, to obtain the reflective substructure.

In an embodiment, the step of forming respective reflective structures in each reflective structure group includes: forming a photosensitive resin material film; exposing the photosensitive resin material film through a gray-scale mask plate, and developing the exposed photosensitive resin material film to obtain a reflective substructure substrate model corresponding to the reflective substructure to be formed, such that the reflective substructure substrate model has a vertical plane and an inclined plane, and a shape of a longitudinal section of the reflective substructure substrate model is a right triangle; and forming a reflective material film on a surface of the reflective substructure substrate model, such that the reflective substructure substrate model and the reflective material film covering a vertical plane and an inclined plane of the reflective substructure substrate model constitute the reflective substructure.

In an embodiment, the step of forming the reflective structure group includes: forming a reflective material film; and patterning the reflective material film to form the plurality of reflective structures and an anti-crosstalk structure, such that the anti-crosstalk structure is located between two adjacent reflective structures, and a side surface of the anti-crosstalk structure facing the second substrate is the reflective surface parallel to the second substrate.

In an embodiment, the reflective material film is formed of a metal material.

DETAILED DESCRIPTION

For better understanding of technical solutions of the present disclosure by those skilled in the art, a display panel, a method for manufacturing the same, and a display device according to embodiments of the present disclosure will be described in detail below with reference to the accompanying drawings.

It should be noted that, the display panel in an embodiment of the present disclosure is a reflective liquid crystal display panel that displays based on reflection principle. In the display panel according to an embodiment of the present disclosure, parallel light provided by an external light source or natural light enters into the liquid crystal display panel from a light incident side, and is emitted outside from a light exiting side by the reflective layer, so that a display image may be observed by a user.

The "visual field of view" in an embodiment of the present disclosure refers to a corresponding area where a user may observe a display image on the display panel normally when light is incident on the display panel in a predetermined direction (predetermined manually). The "predetermined direction" may generally be designed to be a direction perpendicular to the display panel (the external light source or the sun is directly facing the display panel, such that the parallel light is perpendicularly incident onto the display panel), and of course, it may also be designed to be inclined at an angle relative to the display panel. In an embodiment of the present disclosure, the "predetermined direction" corresponding to light incident into the display panel, a number of "visual fields of view", and specific position of each "visual field of view" relative to the display panel may be predetermined according to actual needs.

Figure 1:
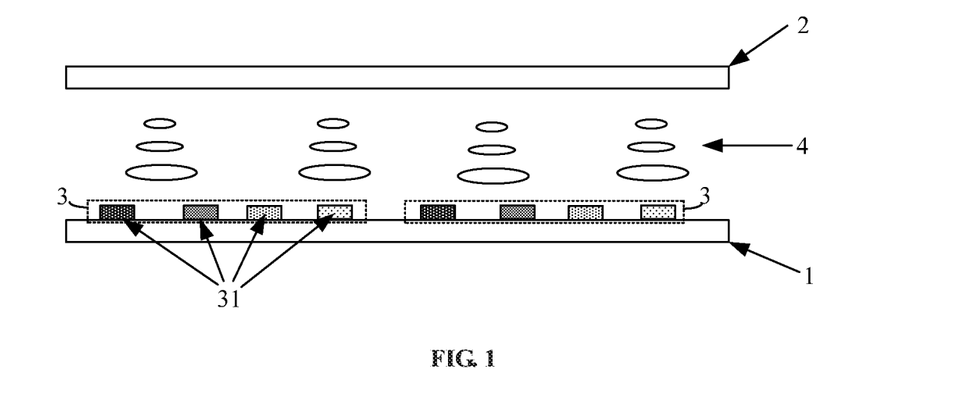
FIG. 1 is a schematic structural view of a display panel according to an embodiment of the present disclosure.
Figure 2:
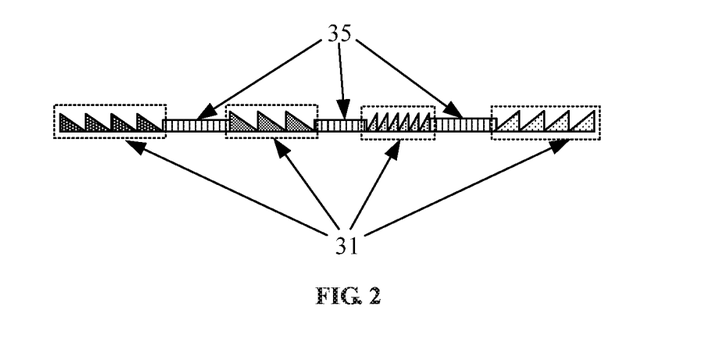
FIG. 2 is a schematic structural view of a reflective structure group according to an embodiment of the present disclosure.
Figure 3:
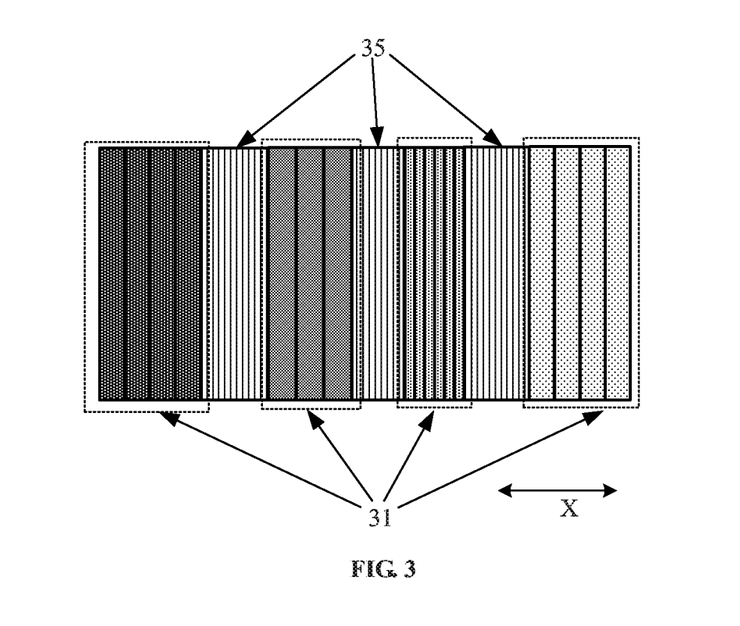
FIG. 3 is a top view of the reflective structure group of FIG. 2.
Figure 4:
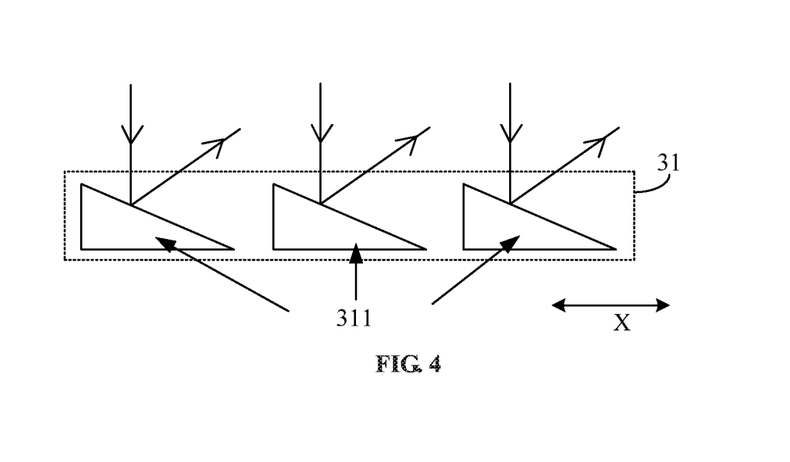
FIG. 4 is a schematic structural view of a reflective structure according to an embodiment of the present disclosure.

FIG. 1 is a schematic structural view of a display panel according to an embodiment of the present disclosure, FIG. 2 is a schematic structural view of a reflective structure group according to an embodiment of the present disclosure, FIG. 3 is a top view of the reflective structure group illustrated in FIG. 2, and FIG. 4 is a schematic structural view of a reflective structure according to an embodiment of the present disclosure. As illustrated in FIG. 1 to FIG. 4, the display panel corresponds to at least two visual fields of view, and includes: a first substrate 1 and a second substrate 2 disposed opposite to each other, a liquid crystal layer 4 disposed between the first substrate 1 and the second substrate 2, and a plurality of reflective structure groups 3 disposed on a side of the first substrate 1 facing the second substrate 2. The reflective structure group 3 includes a plurality of reflective structures 31 in one-to-one correspondence with the visual fields of view, and a reflective surface of the reflective structure 31 faces the second substrate 2 and is configured to reflect light from the second substrate 2 in a predetermined direction to a corresponding visual field of view.

In an embodiment, the material of the reflective structure 31 may be a metal material. For example, the material of the reflective structure 31 may be metallic silver, and a surface of the structure composed of metallic silver may provide a good reflection effect of specular reflection.

It should be noted that, the display panel in this embodiment may be one of: a Twisted Nematic (TN) type liquid crystal display panel, an In-Plane Switching (IPS) type liquid crystal display panel, a Fringe Field Switching (FFS) type liquid crystal display panel, a vertical alignment (VA) type liquid crystal display panel, and an Advanced Super Dimension Switch (ADS) type liquid crystal display panel. Specific content of an orientation layer (not shown, the orientation layer is in contact with the liquid crystal layer 4) for orienting the liquid crystal and electrodes (pixel electrodes and common electrodes) for driving the liquid crystal for deflection in each of the above types of liquid crystal display panels will not be described herein.

In this embodiment, the first substrate I may be an array substrate, and the second substrate 2 may be an opposite substrate. In this case, a thin film transistor array is disposed on the first substrate 1, and a color film layer (color filter pattern array) for color display is disposed on the second substrate 2. Of course, the disclosure is not limited thereto. In another embodiment, the first substrate I may be an opposite substrate, and the second substrate 2 may be an array substrate.

The principle of implementing multiple visual fields of view for a display panel according to an embodiment of the present disclosure will be described in detail below with reference to the accompanying drawings.

Figure 5:
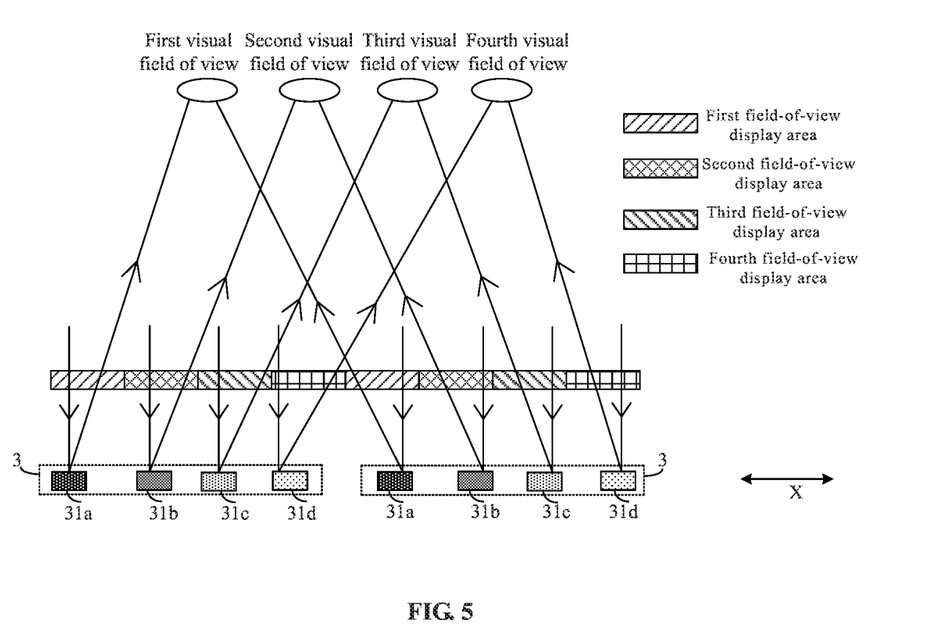
FIG. 5 is a schematic diagram illustrating a principle of implementing multiple visual fields of view for a display panel to display according to an embodiment of the disclosure.

FIG. 5 is a schematic diagram illustrating the principle of implementing multiple visual fields of view for a display panel to display according to an embodiment of the disclosure. As illustrated in FIG. 5, in this embodiment, the display panel is divided into a plurality of field-of-view display area groups for the multiple visual fields of view, and the plurality of display area groups are in one-to-one correspondence with the reflective structure groups 3. The field-of-view display area group is divided into a plurality of field-of-view display areas arranged along the first direction X and in one-to-one correspondence with the fields of view, and the field-of-view display areas are in one-to-one correspondence with the reflective structures 31.

Taking the predetermined direction being a direction perpendicular to the display panel as an example, it is assumed that the number of visual fields of view is four, and the visual fields of view are respectively referred to as a first visual field of view, a second visual field of view, a third visual field of view, and a fourth visual field of view; the four field-of-view display areas corresponding to the four visual fields of view on the display panel are respectively referred to as a first field-of-view display area, a second field-of-view display area, a third field-of-view display area, and a fourth field-of-view display area; the four reflective structures 31 in the reflective structure group 3 corresponding to the above four visual fields of view are respectively referred to as a first reflective structure 31a, a second reflective structure 31b, a third reflective structure 31c, and a fourth reflective structure 31d.

In the first field-of-view display area on the display panel, the parallel light is perpendicular to the display panel and is incident on the first field-of-view display area; after passing through the liquid crystal layer 4, the light reaches a reflective surface of the first reflective structure 31a corresponding to the first field-of-view display area. In this case, the first reflective structure 31a reflects the light such that the reflected light is emitted from the first field-of-view display area (a field-of-view display area same for the incident light), and is directed toward the first visual field of view. Therefore, the user may observe, in the first visual field of view, a first display image presented by the first field-of-view display area on the display panel.

In the second field-of-view display area on the display panel, the parallel light is perpendicular to the display panel and is incident on the second field-of-view display area; after passing through the liquid crystal layer 4, the light reaches a reflective surface of the second reflective structure 31b corresponding to the second field-of-view display area. In this case, the second reflecting structure 31b reflects the light such that the reflected light is emitted from the second field-of-view display area (a field-of-view display area same for the incident light), and is directed toward the second visual field of view, Therefore, the user may observe, in the second visual field of view, a second display image presented by the second field-of-view display area on the display panel.

In the third field-of-view display area on the display panel, the parallel light is perpendicular to the display panel and is incident on the third field-of-view display area; after passing through the liquid crystal layer 4, the light reaches a reflective surface of the third reflective structure 31c corresponding to the third field-of-view display area. In this case, the third reflecting structure 31c reflects the light such that the reflected light is emitted from the third field-of-view display area (afield-of-view display area same for the incident light), and is directed toward the third visual field of view. Therefore, the user may Observe, in the third visual field of view, a third display image presented by the third field-of-view display area on the display panel.

In the fourth field-of-view display area on the display panel, the parallel light is perpendicular to the display panel and is incident on the fourth field-of-view display area; after passing through the liquid crystal layer 4, the light reaches a reflective surface of the fourth reflective structure 31d corresponding to the fourth field-of-view display area. In this case, the fourth reflecting structure 31d reflects the light such that the reflected light is emitted from the fourth field-of-view display area (a field-of-view display area same for the incident light), and is directed toward the fourth visual field of view. Therefore, the user may observe, in the fourth visual field of view, a fourth display image presented by the fourth field-of-view display area on the display panel.

It can be seen that the display panel provided by the present disclosure may realize multiple visual fields of view. When two eyes of a user are in different fields of view, the left-eye and the right-eye may respectively see different display images, thereby achieving the naked-eye 3D effect.

It should be noted that, an inclination angle of the reflective surface of each reflective structure 31 in each of the reflective structure groups 3 may be designed according to a position of the reflective structure 31 in the display panel and a position of the visual field of view corresponding to the reflective structure 31. For different reflective structures 31 located in different reflective structure groups 3 but corresponding to a same visual field of view, the inclination angles of reflective surfaces thereof may be different.

Further, although the number of visual fields of view illustrated in the above embodiments is four and the four visual fields of view are arranged along the first direction X, the disclosure is not limited thereto. In the disclosure, the number and position of the visual fields of view may be designed as required. For example, in another embodiment, the number of visual fields of view is three. In another embodiment, all the visual fields of view are arranged in an array. In practical applications, when a physical resolution of the display panel is constant and the resolutions of respective display images corresponding to the visual fields of view are the same, the resolution of the display image corresponding to each visual field of view decreases and the display effect gets worse as the number of visual fields of view increases. In this regard, the number of visual fields of view for the display panel according to an embodiment of the present disclosure may be 2 to 4, to ensure a better display quality while realizing multiple visual fields of view.

In an embodiment of the present disclosure, the reflective structure 31 includes a plurality of reflective substructures 311 disposed along the first direction X, and the reflective surfaces of the reflective substructures 311 located in a same reflective structure 31 are disposed in parallel, as illustrated in FIG. 4. When the parallel light is directed to the reflective surface of the reflective substructure 311, the reflected light at the reflective surface of the reflective substructure 311 undergoes enhanced interference, thereby increasing display brightness and improving contrast of the display panel in a low light environment. In an embodiment, a shape of a longitudinal section of the reflective substructure 311 (a section perpendicular to the display panel and parallel to the first direction X) is a right triangle, and a surface represented by a hypotenuse of the right triangle functions as the reflective surface. The number of the reflective substructures 311 in each of the reflective structures 31 may be one or more.

Figure 6:
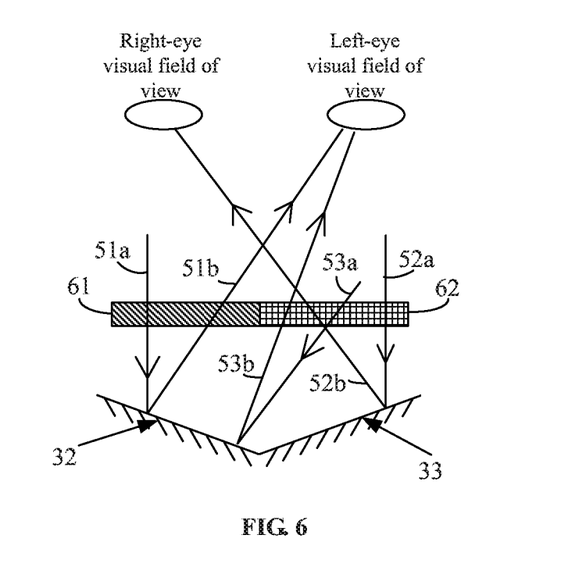
FIG. 6 is a schematic diagram of a crosstalk between two display images on adjacent field-of-view display areas on the display panel according to an embodiment of the present disclosure.

FIG. 6 is a schematic diagram of a crosstalk between two display images on adjacent field-of-view display areas on the display panel according to an embodiment of the present disclosure. As illustrated in FIG. 6, there are two visual fields of view, which are respectively referred to as a left-eye visual field of view and a right-eye visual field of view; field-of-view display areas on the display panel corresponding to the above two visual fields of view are a left-eye field-of-view display area and a right-eye field-of-view display area, and a pixel in the left-eye field-of-view display area is a left-eye pixel 61, and a pixel in the right-eye field-of-view display area is a right-eye pixel 62; the reflective structures 31 in a reflective structure group 3 corresponding to the above two visual fields of view are respectively referred to as a left-eye reflective structure and a right-eye reflective structure, and the left-eye reflective structure has a left-eye reflective surface 32, and the right-eye reflective structure has a right-eye reflective surface 33.

When the naked-eye 3D display is performed, a light ray 51a incident on the left-eye pixel 61 in a predetermined direction is reflected by the left-eye reflective surface 32, and then the reflected light ray 51b passes through the left-eye pixel 61 again and is directed to the left-eye visual field of view, to form a left-eye display image in the left-eye of the user; a light ray 52a incident on the right-eye pixel 62 in a predetermined direction is reflected by the right-eye reflective surface 33, and then the reflected light ray 52b passes through the right-eye pixel 62 again and is directed to the right-eye visual field of view, to form a right-eye display image in the right-eye of the user. However, in an actual use, it is inevitable that some ambient light which is not at a predetermined angle may be directed to the display panel. For example, as shown by ambient light ray 53a in FIG. 6, the ambient light ray 53a is incident on the right-eye pixel 62 at a non-predetermined angle and is reflected by the left-eye reflective surface 32, and then the reflected light ray 53b passes through the right-eye pixel 62 again and is directed to the left eye of the user. In this case, image crosstalk occurs.

Figure 7:
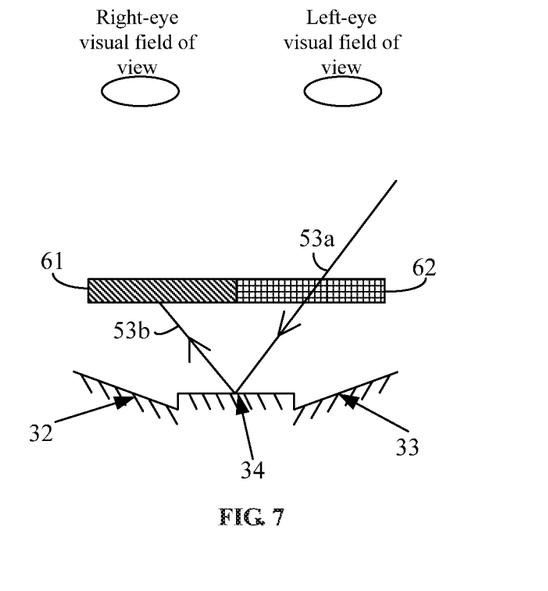
FIG. 7 is a schematic diagram of an anti-crosstalk structure disposed between two adjacent reflective structures according to another embodiment of the present disclosure.

In order to solve the above technical problem, another embodiment of the present disclosure provides an anti-crosstalk structure 35 between two adjacent reflective structures 31, as illustrated in FIG. 2 and FIG. 3. A side of the anti-crosstalk structure 35 facing the second substrate 2 is an anti-crosstalk surface parallel to the second substrate 2, and the anti-crosstalk surface is a reflective surface or a light absorbing surface, so that the problem of image crosstalk may be effectively solved. FIG. 7 illustrates a schematic diagram of an anti-crosstalk structure disposed between two adjacent reflective structures according to this embodiment. As illustrated in FIG. 7, the anti-crosstalk structure disposed between two adjacent reflective structures 32 and 33 has an anti-crosstalk surface 34. In this embodiment, the anti-crosstalk surface 34 of the anti-crosstalk structure is a reflective surface. The ambient light ray 53a, which causes the image crosstalk in FIG. 6, passes through the right-eye pixel and is directed to the anti-crosstalk surface 34, then is reflected by the anti-crosstalk surface 34, and the reflected light ray 53b is directed to the left-eye pixel. In the color display panel, since color of a color film (color filter pattern) corresponding to the left-eye pixel is different from that corresponding to the right-eye pixel, the reflected light ray 53b cannot pass through the display panel, thereby effectively preventing the crosstalk between the left-eye display image and the right-eye display image from occurring.

In another embodiment, the anti-crosstalk surface 34 of the anti-crosstalk structure 35 is a light absorbing surface. In this embodiment, the ambient light ray 53a passes through the right-eye pixel and is directed to the anti-crosstalk surface, and the anti-crosstalk surface 34 absorbs the light ray 53a, thereby effectively preventing the crosstalk between the left-eye display image and the right-eye display image from occurring.

In the embodiment in which the anti-crosstalk surface of the anti-crosstalk structure 35 is a reflective surface, the anti-crosstalk structure 35 is integrally formed with the reflective structure 31. That is, the anti-crosstalk structure 35 and the reflective structure 31 may be manufactured by one patterning. Specific manufacturing process may be referred to the following content.

It should be noted that the above-mentioned case, in which the visual fields of view include the left-eye visual field of view and the right-eye visual field of view and the anti-crosstalk structure 35 is configured to prevent the crosstalk between the left-eye display image and the right-eye display image from occurring, is merely exemplary. It should be known to those skilled in the art that, when there are multiple visual fields of view, the crosstalk between display images corresponding to any two adjacent fields of view may be effectively prevented by disposing the anti-crosstalk structure 35 between the two adjacent reflective structures 31.

In another embodiment, when a pixel electrode and/or a common electrode is disposed on the first substrate, the pixel electrode and/or the common electrode on the first substrate may be made of a metal material, and the pixel electrode and/or the common electrode may further function as the reflective structure.

Figure 8A:
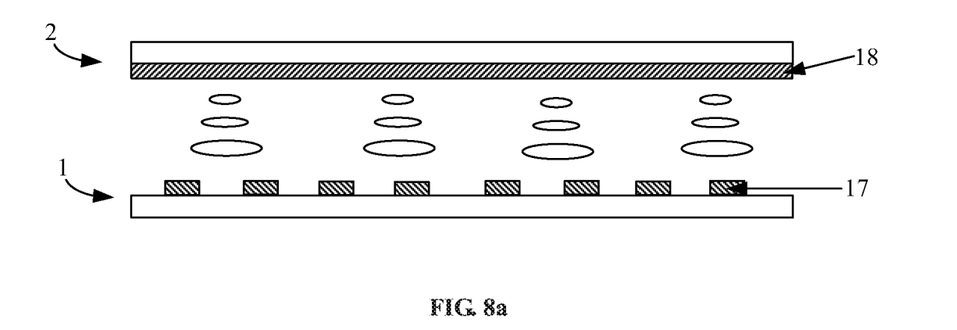
FIG. 8a is a schematic diagram of a display panel provided with a pixel electrode disposed on a first substrate and further functioning as the reflective structure according to an embodiment of the disclosure.

FIG. 8a is a schematic diagram of a display panel provided with a pixel electrode disposed on a first substrate and further functioning as the reflective structure according to an embodiment of the disclosure. As illustrated in FIG. 8a, the first substrate 1 is provided with a pixel electrode 17, and the second substrate 2 is provided with a common electrode 18, and the pixel electrode 17 is made of a metal material, and the common electrode 18 is made of a transparent material. A vertical electric field is generated between the pixel electrode 17 and the common electrode 18 to control deflection of liquid crystal. In this embodiment, the pixel electrode 17 may further function as the reflective structure.

In another embodiment, the pixel electrode 17 may be disposed on the second substrate 2, and the pixel electrode 17 may be made of a transparent material, the common electrode 18 may be disposed on the first substrate, and the common electrode 18 may be made of a metal material. In this embodiment, the common electrode 18 may further function as the reflective structure.

Figure 8B:
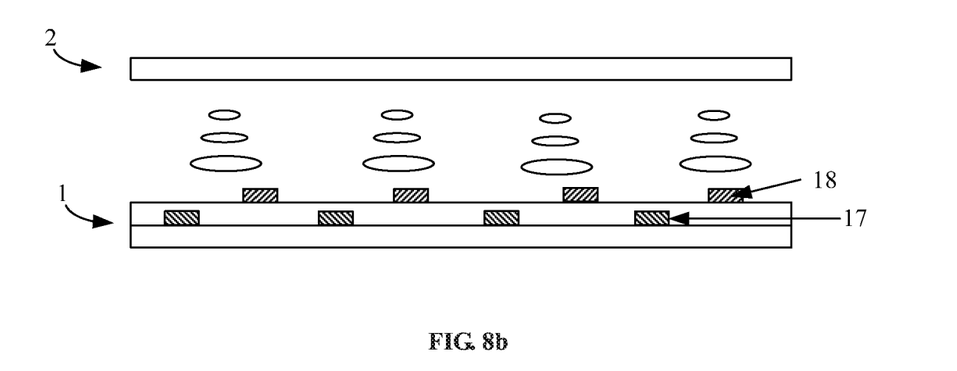
FIG. 8b is a schematic diagram of a display panel provided with a pixel electrode and a common electrode which are both disposed on the first substrate and may further function as the reflective structure according to an embodiment of the present disclosure.

FIG. 8b is a schematic diagram of a display panel provided with a pixel electrode and a common electrode which are both disposed on the first substrate and may further function as the reflective structure according to an embodiment of the present disclosure. As illustrated in FIG. 8b, the pixel electrode 17 and the common electrode 18 are both located on the first substrate, and a fringe electric field is generated between the pixel electrode 17 and the common electrode 18 to control deflection of liquid crystal. In this embodiment, the pixel electrode 17 and the common electrode 18 are both made of a metal material and further function as the reflective structures.

It can be seen from the above that, by further configuring the common electrode 18 and/or the pixel electrode 17 as the reflective structure, it is not required to further design an additional film layer to form the reflective structure, and a thickness of the display panel may be effectively reduced, which is benefit for a low profile of the display panel. Of course, the disclosure is not limited thereto. A case in which the reflective structure is formed by designing an additional film layer on a side of the first substrate 1 facing the second substrate 2 or a side facing away from the second substrate 2 also falls within the protection scope of the present disclosure. The disclosure does not limit the position of the reflective structure as long as the reflective structure may reflect the light passing through the liquid crystal layer.

Figure 9:
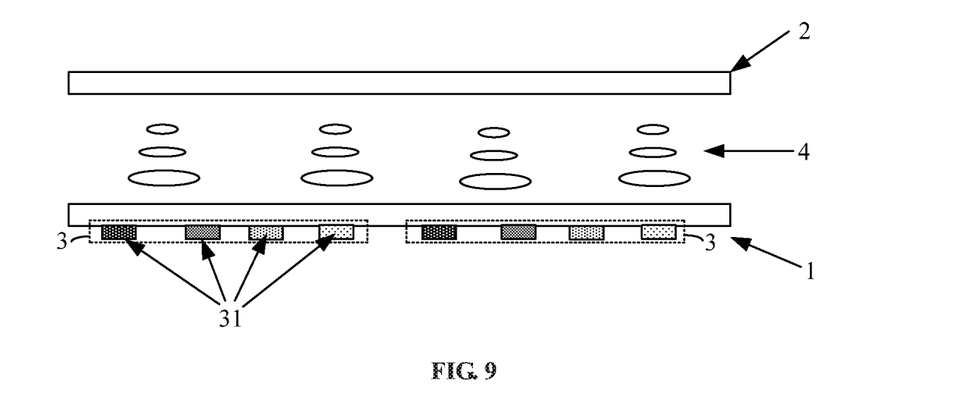
FIG. 9 is a schematic structural view of a display panel according to an embodiment of the present disclosure.

FIG. 9 is a schematic structural view of a display panel according to an embodiment of the present disclosure. As illustrated in FIG. 9, unlike the above embodiment, the reflective structure group 3 according to this embodiment is located on a side of the first substrate 1 facing away from the second substrate 2. The specific process of implementing the multiple visual fields of view for the display panel to display by using the reflective structure group 3 in this embodiment will not be described herein again.

An embodiment of the present disclosure provides a display device including a display panel according to the above embodiment. Descriptions of the display panel may refer to the content in the foregoing embodiments and will not be described herein again.

Figure 10:
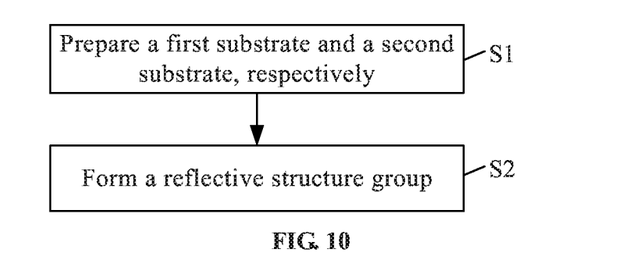
FIG. 10 is a flow chart of a method of manufacturing a display panel according to an embodiment of the present disclosure.

An embodiment of the present disclosure provides a method of manufacturing a display panel according to the above embodiment. FIG. 10 is a flow chart illustrating a method of manufacturing a display panel according to an embodiment of the present disclosure. As illustrated in FIG. 10, the method of manufacturing the display panel includes: steps S1-S2.

At the step S1, a first substrate and a second substrate is prepared, respectively.

One of the first substrate and the second substrate is an array substrate, and the other is an opposite substrate. The first substrate and the second substrate may be prepared by an existing manufacturing process for an array substrate and an existing manufacturing process for an opposite substrate.

At the step S2, reflective structure groups are formed such that the reflective structure groups are located on a side of the first substrate facing the second substrate or distal to the second substrate, and each reflective structure group includes a plurality of reflective structures in one-to-one correspondence with the visual fields of view.

The reflective surface of each reflective structure faces the second substrate, and the reflective structure is configured to reflect the light from the second substrate in a predetermined direction to a corresponding visual field of view.

Figure 11:
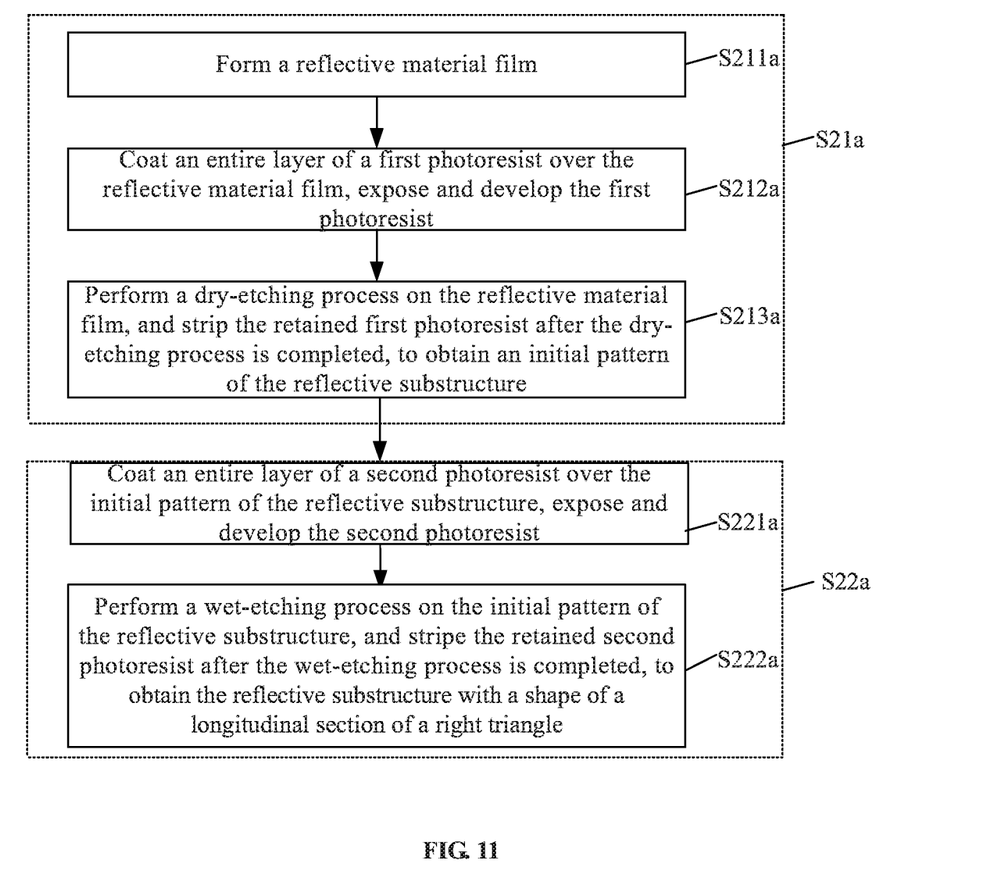
FIG. 11 is a specific flow chart illustrating the step S2 of FIG. 10 according to an embodiment of the present disclosure.
Figure 12:
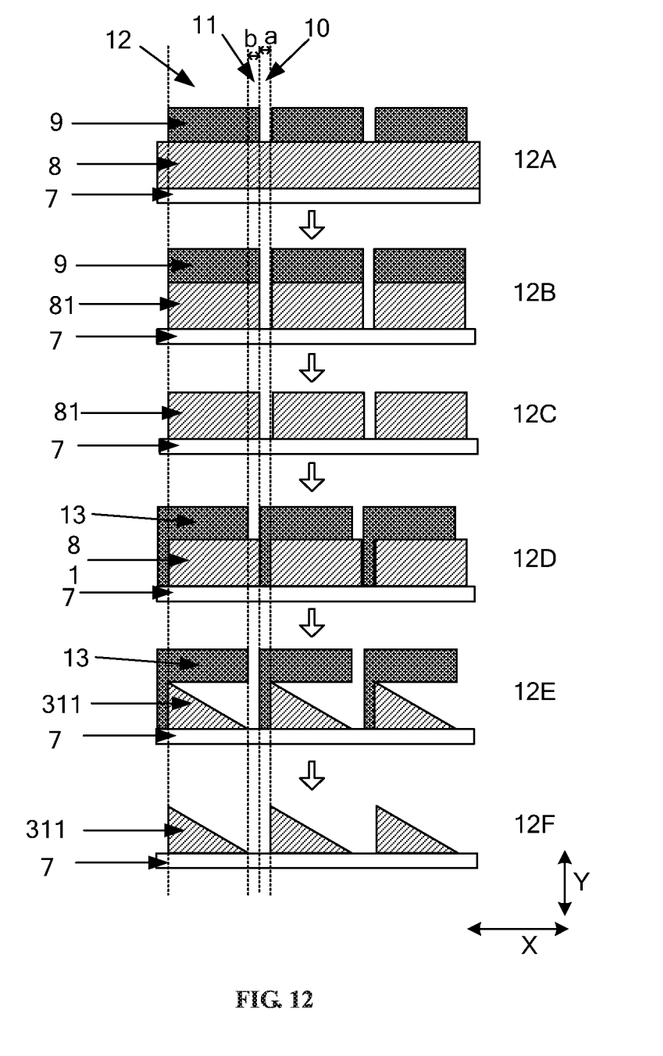
FIG. 12 is a schematic diagram illustrating a process of manufacturing a reflective structure group by using the flow chart illustrated in FIG. 11.

FIG. 11 is a specific flow chart illustrating the step S2 of FIG. 10 according to an embodiment of the present disclosure, and FIG. 12 is a schematic diagram illustrating a process of manufacturing a reflective structure group by using the flow chart illustrated in FIG 11. As illustrated in FIG. 11 and FIG. 12, when the reflective structure includes a plurality of reflective substructures disposed along the first direction, and a shape of a longitudinal section of the reflective substructure is a right triangle, the step S2 according to the embodiment includes: forming respective reflective structures in each reflective structure group, and each reflective structure includes a plurality of reflective substructures disposed along the first direction, and reflective surfaces of the respective reflective substructures located in a same reflective structure are disposed in parallel.

Specifically, the step of forming the respective reflective structures includes: steps S21a-S22a.

At the step S21a, an initial pattern of the reflective substructure, corresponding to the reflective substructure to be formed, is formed by a first patterning process, such that a shape of a longitudinal section of the initial pattern of the reflective substructure is a rectangle.

The step S21a specifically includes: steps S211a and S212a.

At the step S211a, a reflective material film is formed.

In the step S211a, a reflective material film 8 is formed on the substrate 7 by an evaporation or vapor deposition process, as illustrated in FIG. 12A. In an embodiment, the material of the reflective material film 8 may be a metal material.

At the step S212a, an entire layer of a first photoresist is coated over the reflective material film, and then is exposed and developed.

Since the shape of the longitudinal section of the reflective substructure is a right triangle, the reflective substructure finally formed must include a vertical plane perpendicular to the display panel and an inclined plane with a certain inclination angle with respect to the display panel.

In an embodiment of the present disclosure, for each reflective substructure, a forming region for the reflective substructure 12, an etching region reserved for the vertical plane 10, and an etching region reserved for the inclined plane 11 may be pre-designed, as illustrated in FIG. 12A. The forming region for the reflective substructure 12 is a region in which the reflective substructure is subsequently formed, the etching region reserved for the vertical plane 10 is a set of all points distant from the bottom of the vertical plane of the reflective substructure in the first direction X by a distance less than or equal to a first predetermined distance a, and the etching region reserved for the inclined plane 11 is a set of all points distant from the bottom of the inclined plane of the reflective substructure in the first direction X by a distance less than or equal to a second predetermined distance b.

The first predetermined distance a and the second predetermined distance b may be designed and adjusted according to actual needs.

After the step S212a, the first photoresist 9 located in the etching region reserved for the vertical plane 10 may be removed, and the first photoresist 9 located in the forming region for the reflective substructure 12 and the etching region reserved for the inclined plane 11 may be retained, as illustrated in FIG. 12(A).

At the step S213a, a dry-etching process is performed on the reflective material film, and the retained first photoresist is stripped after the dry-etching process is completed, to obtain the initial pattern of the reflective substructure.

Since the dry-etching process merely etches the corresponding film layer in a vertical direction Y, a side of an initial pattern of the reflective substructure 81 formed by the dry-etching process must be perpendicular to the display panel (the longitudinal section of the initial pattern of the reflective substructure 81 is a rectangular). In this case, a side of the initial pattern of the reflective substructure 81 may function as the vertical plane of the reflective substructure finally formed. FIG. 12B illustrates the initial pattern of the reflective substructure with the first photoresist coated thereon, obtained after the dry-etching process is completed. FIG. 12C illustrates the initial pattern of the reflective substructure obtained by stripping the retained first photoresist after the dry-etching process is completed.

It should be noted that, in this embodiment, the initial patterns of the reflective substructures in the respective reflective structures on the display panel may be manufactured simultaneously by one patterning process, to shorten the production cycle.

The step of forming the respective reflective structures further includes: At the step S22a, the initial pattern of the reflective substructure is bevel-etched by a second patterning process to form the reflective substructure, such that a shape of longitudinal section of the reflective substructure is a right triangle.

The step S22a specifically includes: steps S221a and S222a.

At the step S221a, an entire layer of a second photoresist is coated over the initial pattern of the reflective substructure, and is then exposed and developed.

After the step S221a, the second photoresist 13 located in the etching region reserved for the inclined plane 11 may be removed, and the second photoresist 13 located in the forming region for the reflective substructure 12 and the etching region reserved for the vertical plane 10 may be retained, as illustrated in FIG. 12D.

The second photoresist 13 located in the etching region reserved for the vertical plane 10 completely covers the vertical plane of the finally formed reflective substructure (a side of the initial pattern of the reflective substructure 81) to avoid the vertical plane from being mis-etched in the subsequent wet-etching process.

At the step S222a: a wet-etching process is performed on the initial pattern of the reflective substructure, and the retained second photoresist is striped after the wet-etching process is completed, to obtain the reflective substructure with a shape of a longitudinal section of a right triangle.

In the wet-etching process, not only etching in the vertical direction Y but also etching in the horizontal direction (the first direction X) may be performed by the etching liquid. By controlling factors such as process parameters and reaction time, an inclined plane with a certain inclination angle may finally be obtained. FIG. 12E illustrates a reflective substructure with a second photoresist coated thereon, obtained after the wet-etching process is completed. FIG. 12F illustrates the reflective substructure obtained by stripping the retained second photoresist after the wet-etching process is completed.

It can be seen from the above that, the vertical plane of the reflective substructure 311 may be obtained by the dry-etching process, the inclined plane of the reflective substructure 311 may be obtained by the wet-etching process, and the inclination angle of the inclined plane may be controlled.

In the step S22a, only one inclined plane with a certain inclination angle may be obtained by one bevel-etching process (the step S221a and the step S222a). Inclined planes with different inclination angles may require multiple bevel-etching processes. In a bevel-etching process, the initial pattern of the reflective substructure that is not required to be etched and the reflective substructure that has been formed may be overlaid and protected by photoresist to avoid mis-etching.

It should be noted that, when the anti-crosstalk structure is formed between the reflective structures and the surface of the anti-crosstalk structure is a reflective surface, the region of the first photoresist retained after the development in the step S212a may be adjusted to retain the first photoresist located in the region reserved for the anti-crosstalk structure. After the dry-etching process in the step S213a, the pattern of the anti-crosstalk structure may be obtained at the same time.

Figure 13:
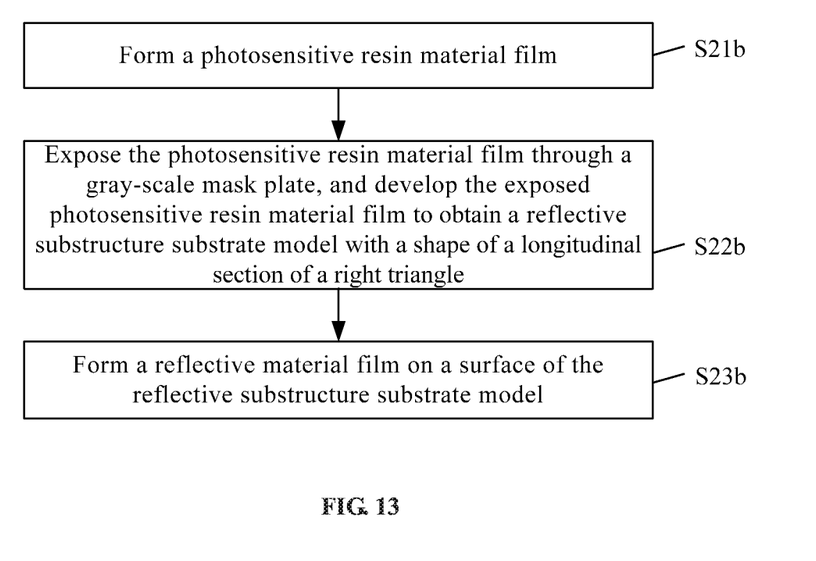
FIG. 13 is a specific flow chart illustrating the step S2 of FIG. 10 according to an embodiment of the present disclosure.
Figure 14:
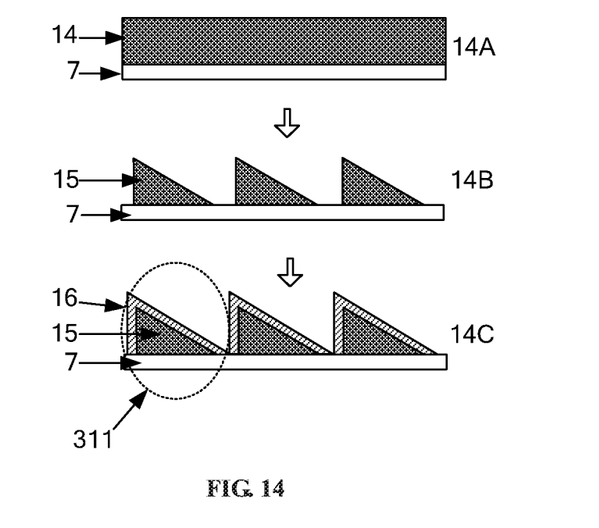
FIG. 14 is a schematic diagram illustrating a process of manufacturing a reflective structure group by using the flow chart illustrated in FIG. 13.

FIG. 13 is a specific flow chart illustrating the step S2 of FIG. 10 according to an embodiment of the present disclosure, and FIG. 14 is a schematic diagram illustrating a process of manufacturing a reflective structure group by using the flow chart illustrated in FIG. 13. As illustrated in FIG. 13 and FIG. 14, when the reflective structure includes a plurality of reflective substructures with shapes of longitudinal sections of right triangles disposed along the first direction, the step S2 according to the embodiment includes: steps S21b to S23b.

At the step S21b, a photosensitive resin material film is formed. At the step S21b, a photosensitive resin material film 14 is applied on the substrate 7, as illustrated in FIG. 14A.

At the step S22b, the photosensitive resin material film is exposed through a gray-scale mask plate, and the exposed photosensitive resin material film is developed to obtain a reflective substructure substrate model corresponding to the reflective substructure to be formed, such that the reflective substructure substrate model has a vertical plane and an inclined plane, and a shape of a longitudinal section of the reflective substructure substrate model is a right triangle.

At the step S22b, the photosensitive resin material film 14 is exposed through a gray-scale mask plate, and the gray-scale mask plate has light-transmissive regions with different light transmittances to expose different regions on the photosensitive resin material film to different degrees. After the development process, a plurality of reflective substructure substrate models 15 with shapes of longitudinal sections of right triangles may be obtained, as illustrated in FIG. 14B. The inclination angle of the inclined plane of the reflective substructure substrate model 15 is the same as that of a corresponding reflective substructure.

At the step S23b, a reflective material film is formed on a surface of the reflective substructure substrate model such that the reflective substructure substrate model and the reflective material film covering a vertical plane and an inclined plane of the reflective substructure substrate model constitute the reflective substructure.

At the step S23b, a uniform reflective material film 16 is formed on the surface of the substrate obtained at the step S22b, as illustrated in FIG. 14C. In an embodiment, the material of the reflective material film 16 is a metal material. The reflective substructure substrate model 15 and the reflective material film 16 covering the vertical plane and the inclined plane of the reflective substructure substrate model 15 constitute the reflective substructure 311. Since the shape of the longitudinal section of the reflective substructure substrate model 15 is a right triangle, the shape of the longitudinal section of the reflective substructure 311 is also a right triangle.

It should be noted that, when the anti-crosstalk structure is formed between the reflective structures and the surface of the anti-crosstalk structure is a reflective surface, the photosensitive resin material in a region corresponding to the anti-crosstalk structure to be formed may be completely or partially retained at the step S22b as an anti-crosstalk structure substrate model. After the step S23b, the anti-crosstalk structure substrate model and a portion of the reflective material film on the upper surface of the anti-crosstalk structure substrate model constitute the anti-crosstalk structure.

In an embodiment according to the present disclosure, when the reflective structure is located on a side of the first substrate facing the second substrate, the reflective structure group may be formed by using the first substrate as a substrate; when the reflective structure is located on a side of the first substrate distal to the second substrate, the reflective structure group may be manufactured on another substrate, and then be placed on the side of the first substrate distal to the second substrate, with the reflective surface of each reflective structure in the reflective structure group facing the second substrate.

It is to be understood that the above embodiments are merely exemplary embodiments employed to explain the principles of the disclosure, and the disclosure is not limited thereto. Various modifications and improvements can be made by those skilled in the art without departing from the spirit and scope of the disclosure, and such modifications and improvements are also considered to fall within the scope of the disclosure.

What is claimed is:

1. A display panel, corresponding to two left-eye visual fields of view and two right-eye visual fields of view, comprising:
    a first substrate;
    a second substrate disposed opposite to the first substrate; and
    at least one reflective structure group disposed on the first substrate, each of which comprises a plurality of reflective structures, which have reflective surface facing the second substrate and are configured to reflect light from the second substrate in a predetermined direction to the two left-eye visual fields of view of the two right-eye visual fields of view,
    each of the plurality of reflective structures in the reflective structure group comprises a plurality of the reflective substructures disposed along a first direction, and has reflective surfaces in parallel and has a longitudinal section in a shape of a right triangle, a hypotenuse of the right triangle functioning as the reflective surface, and
    the plurality of reflective structures comprise four reflective structures, which comprise first two adjacent reflective structures and second two adjacent reflective structures disposed along the first direction,
    the reflective substructures in the first two adjacent reflective structures comprise right-angled sides, perpendicular to the first substrate, on a first side along the first direction with respect to their hypotenuses; the reflective substructures in the second two adjacent reflective structures comprise right-angled sides, perpendicular to the first substrate, located on a second side along the first direction with respect to their hypotenuses, and
    the first side is opposite to the second side along the first direction.

2. The display panel of claim 1, wherein
    the display panel is divided into a plurality of field-of-view display area groups in one-to-one correspondence with the reflective structure groups;
    each of the plurality of field-of-view display area groups is divided into a plurality of field-of-view display areas corresponding to the visual fields of view; and
    the field-of-view display areas are in one-to-one correspondence with the reflective structures.

3. The display panel of claim 1, wherein the reflective structure is made of a metal material.

4. The display panel of claim 1, further comprising an anti-crosstalk structure disposed between two adjacent reflective structures such that a side of the anti-crosstalk structure facing the second substrate is an anti-crosstalk surface parallel to the second substrate, and the anti-crosstalk surface is a reflective surface or a light absorbing surface.

5. The display panel of claim 4, wherein the anti-crosstalk surface is the reflective surface, and the anti-crosstalk structure is integrated formed with the reflective structure.

6. The display panel of claim 1, wherein the display panel is a reflective liquid crystal display panel.

7. The display panel of claim 6, wherein the first substrate is provided with a pixel electrode made of a metal material, and the pixel electrode further functions as the reflective structure.

8. The display panel of claim 6, wherein the first substrate is provided with a common electrode made of a metal material, and the common electrode further functions as the reflective structure.

9. A display device, comprising the display panel of claim 1.

10. a method of manufacturing a display panel corresponding to two left-eye visual fields of view and two right-eye visual fields of view, comprising steps of:
    preparing a first substrate and a second substrate disposed opposite to the first substrate, respectively; and forming at least one reflective structure group on the first substrate such that each of the at least one reflective structure group comprises a plurality of reflective structures which have reflective surfaces facing the second substrate, and are configured to reflect light from the second substrate in a predetermined direction to the two left-eye visual fields of view of the two right-eye visual fields of view, each of the plurality of reflective structures in the reflective structure group comprises a plurality of the reflective substructures disposed along a first direction, and has reflective surfaces in parallel and has a longitudinal section in a shape of a right triangle, a hypotenuse of the right triangle functioning as the reflective surface, and the plurality of reflective structures comprise four reflective structures, which comprise first two adjacent reflective structures and second two adjacent reflective structures disposed along the first direction, the reflective substructures in the first two adjacent reflective structures comprise right-angled sides, perpendicular to the first substrate, on a first side along the first direction with respect to their hypotenuses; the reflective substructures in the second two adjacent reflective structures comprise right-angled sides, perpendicular to the first substrate, located on a second side along the first direction with respect to their hypotenuses, and the first side is opposite to the second side along the first direction.

11. The method of manufacturing the display panel of claim 10, wherein the step of forming the reflective structure group comprises:

forming the plurality of reflective structures in the reflective structure group such that each reflective structure of the plurality of reflective structures comprises the plurality of reflective substructures disposed along the first direction, and reflective surfaces of the respective reflective substructures located in the same reflective structure are disposed in parallel.

12. The method of manufacturing the display panel of claim 11, wherein the step of forming the plurality of reflective structures in the reflective structure group comprises:

forming, by a first patterning process, an initial pattern of the reflective substructure corresponding to the reflective substructure to be formed such that a shape of a longitudinal section of the initial pattern of the reflective substructure is a rectangle; and performing a bevel-etching process on the initial pattern of the reflective substructure by a second patterning process to form the reflective substructure such that a shape of a longitudinal section of the reflective substructure is a right triangle.

13. The method of manufacturing the display panel of claim 12, wherein the step of forming, by the first patterning process, the initial pattern of the reflective substructure corresponding to the reflective substructure to be formed comprises:

forming a reflective material film;

coating an entire layer of a first photoresist over the reflective material film, exposing and developing the first photoresist to remove the first photoresist located in an etching region reserved for a vertical plane and retain the first photoresist located in a forming region for the reflective substructure and an etching region reserved for an inclined plane; and performing a dry-etching process on the reflective material film, and stripping the retained first photoresist after the dry-etching process is completed, to obtain an initial pattern of the reflective substructure.

14. The method of manufacturing the display panel of claim 12, wherein the step of performing a bevel-etching on the initial pattern of the reflective substructure by the second patterning process to form the reflective substructure comprises:

coating an entire layer of a second photoresist over the initial pattern of the reflective substructure, exposing and developing the second photoresist to remove the second photoresist located in an etching region reserved for a vertical plane and retain the first photoresist located in a forming region for the reflective substructure and an etching region reserved for an inclined plane; and performing a wet-etching process on the initial pattern of the reflective substructure, and stripping the retained second photoresist after the wet-etching process is completed, to obtain the reflective substructure.

15. The method of manufacturing the display panel of claim 11, wherein the step of forming the plurality of reflective structures in the reflective structure group comprises:

forming a photosensitive resin material film;

exposing the photosensitive resin material film through a gray-scale mask plate, and developing the exposed photosensitive resin material film to obtain a reflective substructure substrate model corresponding to the reflective substructure to be formed, such that the reflective substructure substrate model has a vertical plane and an inclined plane, and a shape of a longitudinal section of the reflective substructure substrate model is a right triangle; and forming a reflective material film on a surface of the reflective substructure substrate model such that the reflective substructure substrate model and the reflective material film covering a vertical plane and an inclined plane of the reflective substructure substrate model constitute the reflective substructure.

16. The method of manufacturing the display panel of claim 10, wherein the step of forming the reflective structure group comprises:

forming a reflective material film; and patterning the reflective material film to form the plurality of reflective structures and an anti-crosstalk structure such that the anti-crosstalk structure is located between two adjacent reflective structures, and a side surface of the anti-crosstalk structure facing the second substrate is the reflective surface parallel to the second substrate.

17. The method of manufacturing the display panel of claim 16, wherein the reflective material film is formed of a metal material.

* * * * *